(Model.)
E. EBI.
DENTAL PLUGGER.
No. 255,955.  Patented Apr. 4, 1882.
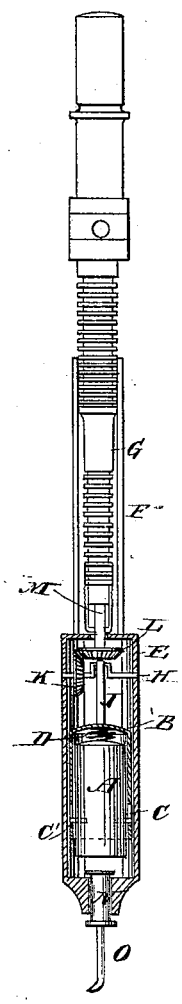
WITNESSES:
Francis McArdle
B. G. Underwood
INVENTOR:
E. Ebi
BY Munn & Co
ATTORNEYS.

UNITED STATES PATENT OFFICE.

EDWARD EBI, OF CEDAR RAPIDS, IOWA.

DENTAL PLUGGER.

SPECIFICATION forming part of Letters Patent No. 255,955, dated April 4, 1882.

Application filed August 31, 1881. (Model.)

*To all whom it may concern:*

Be it known that I, EDWARD EBI, of Cedar Rapids, in the county of Linn and State of Iowa, have invented a new and Improved Dental Mallet, of which the following is a full, clear, and exact specification.

The invention consists in a plunger contained in a casing sliding in a tubular casing attached to a dental engine hand-piece, and connected with a crank-shaft on which a bevel-gear wheel is mounted, engaging with a bevel-gear wheel attached to the end of a shaft fitting in the rotating part of the dental hand-piece, whereby the plunger will be reciprocated, as will be more fully described hereinafter.

Reference is to be had to the accompanying drawing, forming part of this specification.

In the accompanying drawing, a longitudinal sectional elevation of my improved dental mallet is shown.

The solid plunger A is contained in a tubular casing, B, provided with two longitudinal slots, C, through which pins C' pass into the plunger A, for the purpose of guiding this plunger and holding it in the casing B. A spiral spring, D, is interposed between the top of the plunger and the top of the casing B. This casing B is adapted to slide in a casing, E, provided at its upper end with a longitudinally-split tube, F, or other suitable springs or devices for holding the casing E to a dental hand-piece, G. The inner casing, B, is connected with a small crank-shaft, H, journaled in the casing E by means of a pivoted connecting-rod, J.

A bevel cog wheel, K, is rigidly mounted on the shaft H and engages with a bevel-cog wheel, L, mounted on the end of a shaft, M, projecting from the upper end of the casing E into the rotating part of the hand-piece G. A short tubular piece, N, with flanges at the top and bottom, fits loosely in the lower beveled and apertured end of the casing E and serves to hold the plugger-point O, which may be of any desired or suitable construction.

The plunger A can be removed and replaced by a lighter or heavier plunger, as circumstances may require.

The operation is as follows: The rotating hand-piece G of the dental engine rotates the shaft M, whereby the wheels K and L and the crank-shaft H are rotated, and the casing B, containing the plunger A, is reciprocated, the plunger A striking the plugger-holder N a blow every time it descends. As the plunger A strikes the plugger-holder N before the crank of the shaft H has completed its half-revolution, the casing B will be lowered slightly more than the plunger, and the spring D will be compressed correspondingly. If the dental engine is operated very slowly, the impact will be gentle; but if the engine is operated rapidly, the blows will follow each other more rapidly and the impact will be much greater.

This plugging-mallet operates equally as well with backward movement of the dental engine as with the forward movement of the same.

Having thus described my invention, I claim as new and desire to secure by Letters Patent—

1. The combination, with the casing E and the operating mechanism, of the casing B and the plunger A, held loosely within the said casing, substantially as and for the purpose set forth.

2. The combination, with the casing E and the operating mechanism, of the casing B, the plunger A, held loose in said casing, and the spring D, interposed between the top of the plunger and casing, substantially as and for the purpose set forth.

3. The combination, with the dental engine hand-piece G, of the shaft M, the crank-shaft H, the bevel-gear wheels K and L, the connecting-rod J, the casing B, the spring D, and the plunger A, contained in the casing B, substantially as herein shown and described, and for the purpose set forth.

EDWARD EBI.

Witnesses:
J. B. MOORE,
T. M. BREES.